(12) United States Patent
Inada et al.

(10) Patent No.: US 8,576,219 B2
(45) Date of Patent: Nov. 5, 2013

(54) LINEAR INTERPOLATION OF TRIANGLES USING DIGITAL DIFFERENTIAL ANALYSIS

(75) Inventors: Tetsugo Inada, Tokyo (JP); Hideaki Tomikawa, Tokyo (JP); Junichi Fujita, Saitama (JP)

(73) Assignee: Sony Corporation, Tokyo (JP)

( * ) Notice: Subject to any disclaimer, the term of this patent is extended or adjusted under 35 U.S.C. 154(b) by 555 days.

(21) Appl. No.: 10/358,729

(22) Filed: Feb. 5, 2003

(65) Prior Publication Data

US 2004/0004620 A1    Jan. 8, 2004

(30) Foreign Application Priority Data

Feb. 6, 2002  (JP) .................................. 2002-029483

(51) Int. Cl.
| | |
|---|---|
| G06T 15/00 | (2011.01) |
| G06T 19/00 | (2011.01) |
| G06T 17/20 | (2006.01) |
| G06T 15/20 | (2011.01) |
| G06T 15/40 | (2011.01) |

(52) U.S. Cl.
CPC ............... G06T 19/00 (2013.01); G06T 17/20 (2013.01); *G06T 15/20* (2013.01); *G06T 15/40* (2013.01)
USPC ........... 345/419; 345/418; 345/420; 345/421; 345/422; 345/423; 345/424; 345/426; 345/427; 345/440; 345/441; 345/443; 345/581; 345/582; 345/629

(58) Field of Classification Search
CPC ......... G06T 19/00; G06T 17/20; G06T 15/20; G06T 15/40
USPC .................. 345/440–443, 419–427, 581–582
See application file for complete search history.

(56) References Cited

U.S. PATENT DOCUMENTS

| | | | | |
|---|---|---|---|---|
| 5,870,097 A | * | 2/1999 | Snyder et al. ................. | 345/426 |
| 5,960,119 A | * | 9/1999 | Echigo et al. ................. | 382/248 |
| 6,151,034 A | * | 11/2000 | Jain et al. ...................... | 345/503 |
| 6,154,223 A | * | 11/2000 | Baldwin ....................... | 345/506 |
| 6,181,838 B1 | * | 1/2001 | Knowlton ..................... | 382/305 |
| 6,323,874 B1 | * | 11/2001 | Gossett ......................... | 345/619 |
| 6,348,919 B1 | * | 2/2002 | Murphy ........................ | 345/421 |

(Continued)

FOREIGN PATENT DOCUMENTS

JP     2000338959 A   * 12/2000

OTHER PUBLICATIONS

Apgar, B.; Bersack, B.; A. Mammen. "A Display System for the Stellar(tm) Graphics Supercomputer Model GS1000(tm)". ACM Computer Graphics, vol. 22, No. 4, Aug. 1988, pp. 255-262.*

*Primary Examiner* — Jin-Cheng Wang
(74) *Attorney, Agent, or Firm* — Finnegan, Henderson, Farabow, Garrett & Dunner, LLP

(57) ABSTRACT

An image processing apparatus able to continuously generate region data, able to eliminate wasteful processing due to invalid regions, and able to efficiently draw an image, is provided with a triangle digital differential analyzer (DDA) circuit for generating region data increased by at least one unit square region worth of data based on set-up data including a change data input from a DDA set-up circuit in a case where at least one pixel is located inside a triangle in a unit square region including a plurality of pixels, storing the region data, further dividing the stored region data into usual region data equivalent to the unit square regions, and outputting the same as DDA data to a texture engine circuit, and a method of the same.

8 Claims, 13 Drawing Sheets

(56) References Cited

U.S. PATENT DOCUMENTS

| | | | |
|---|---|---|---|
| 6,466,229 B1* | 10/2002 | Nagao | 345/621 |
| 6,480,199 B1* | 11/2002 | Oomori et al. | 345/536 |
| 6,803,918 B1* | 10/2004 | Ohmori et al. | 345/552 |
| 6,847,378 B2* | 1/2005 | Oberoi et al. | 345/600 |
| 6,940,512 B2* | 9/2005 | Yamaguchi et al. | 345/505 |
| 6,992,664 B2* | 1/2006 | Ohmori | 345/419 |
| 7,027,066 B2* | 4/2006 | Ohmori | 345/582 |
| 2001/0040999 A1* | 11/2001 | Fukuda | 382/162 |
| 2002/0070947 A1* | 6/2002 | Dorbie et al. | 345/582 |
| 2002/0101417 A1* | 8/2002 | Burk et al. | 345/418 |
| 2002/0101428 A1* | 8/2002 | Hsiao et al. | 345/539 |
| 2003/0169274 A1* | 9/2003 | Oberoi et al. | 345/589 |
| 2004/0196283 A1* | 10/2004 | Lewis et al. | 345/419 |

* cited by examiner

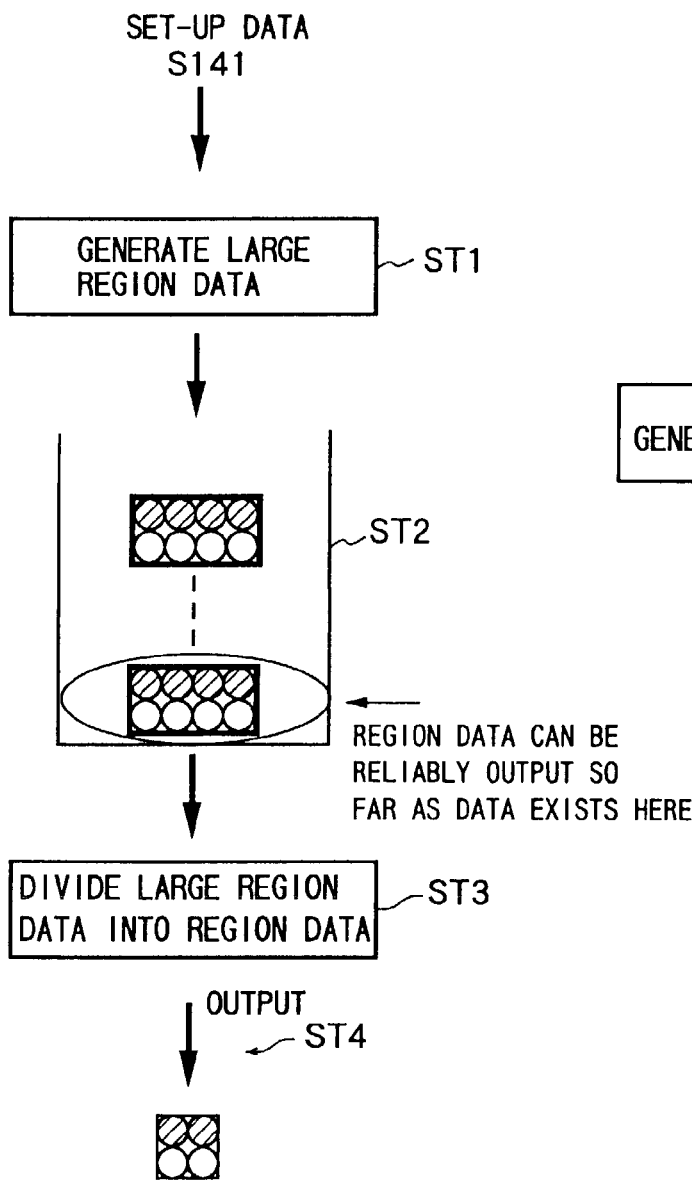
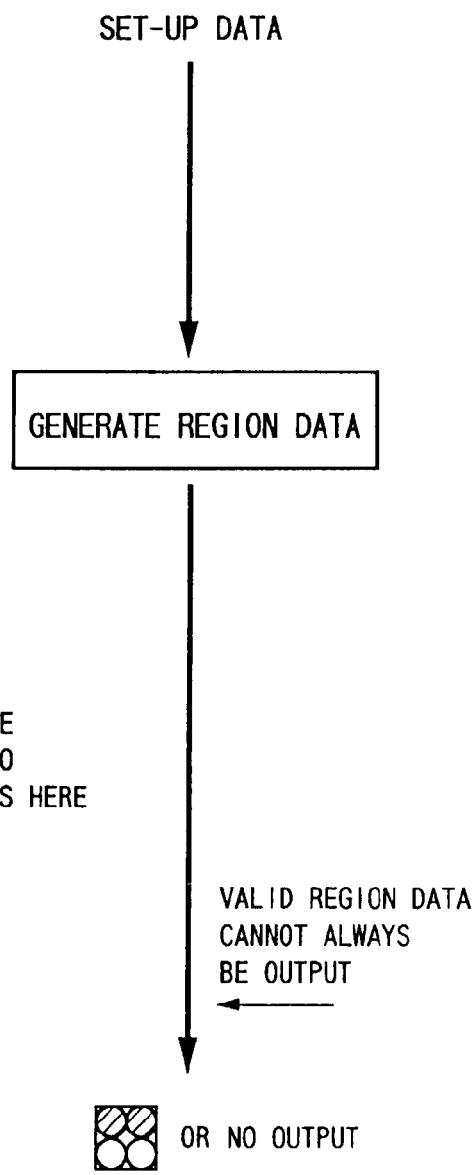

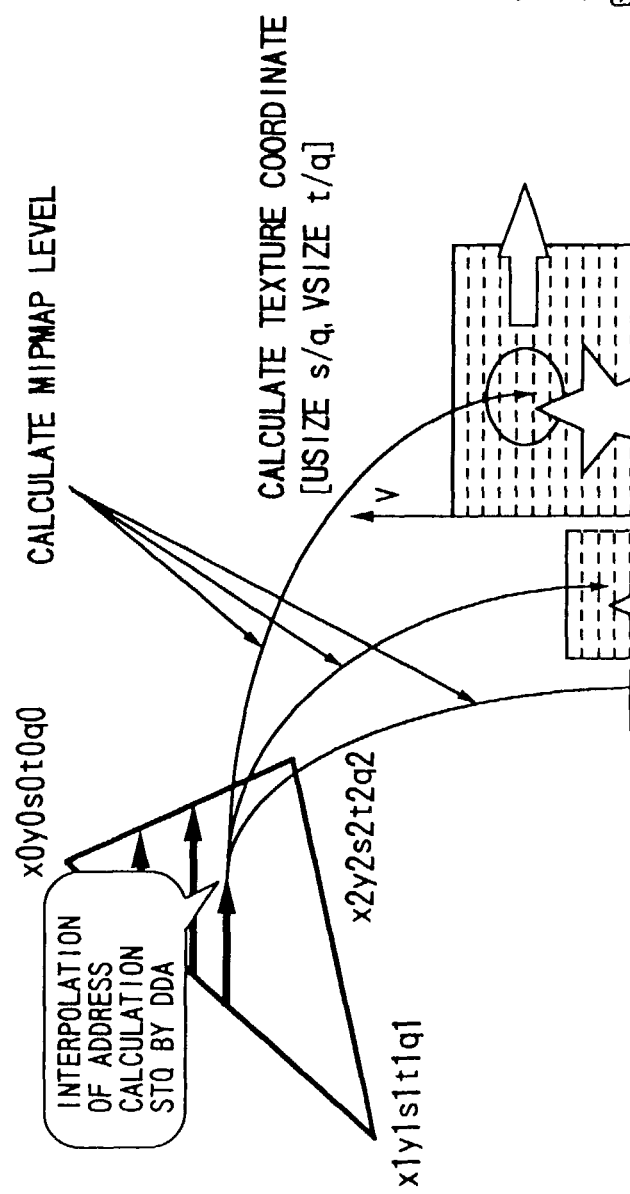
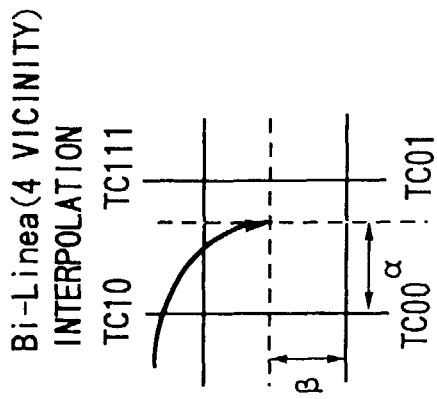

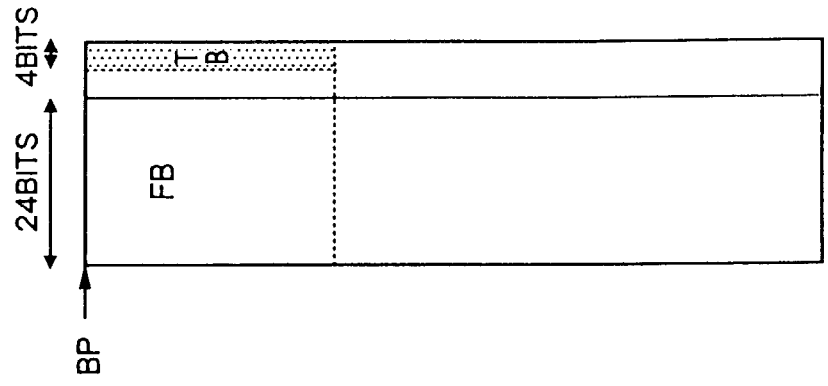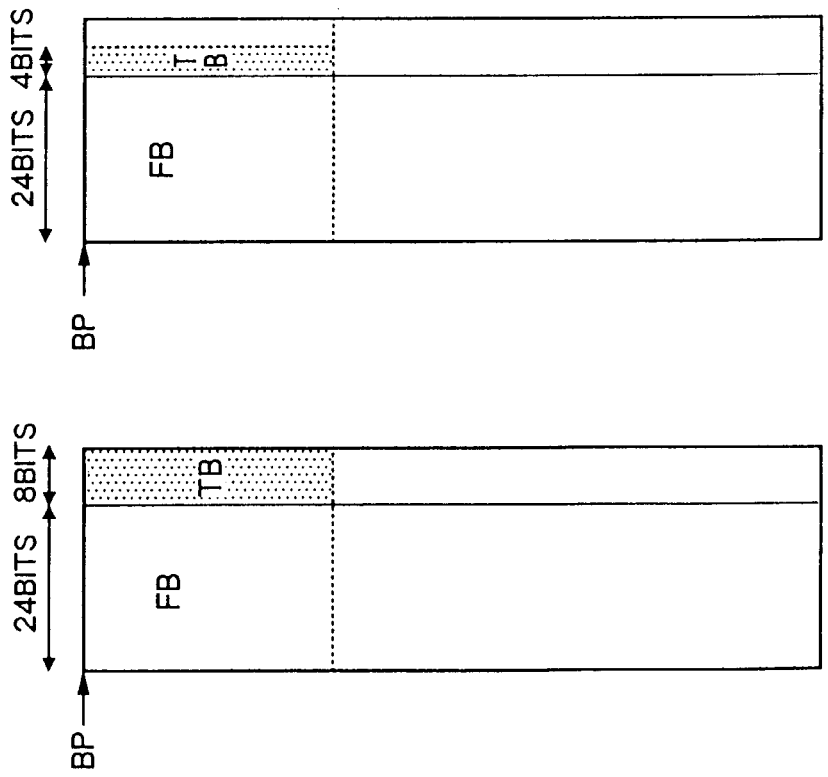

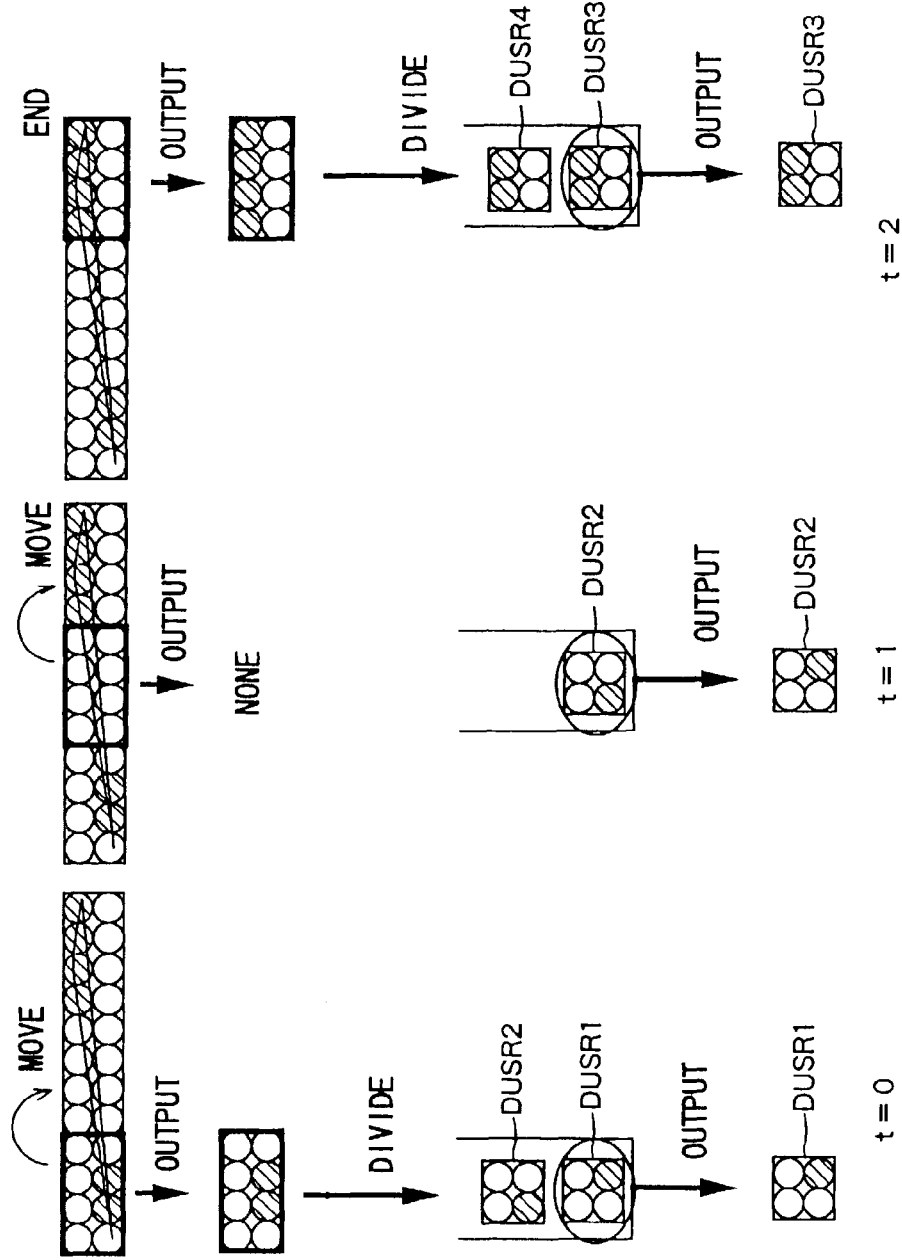

LINEAR INTERPOLATION OF TRIANGLES USING DIGITAL DIFFERENTIAL ANALYSIS

BACKGROUND OF THE INVENTION

1. Field of the Invention

The present invention relates to an image processing apparatus for expressing a model by a combination of unit graphics and generating pixels in a drawn object region of a screen coordinate system and a method of the same.

2. Description of the Related Art

Along with also the improvement of operating speeds and the strengthening of graphic drawing functions in recent computer systems, computer graphics (CG) technology for using computer resources to prepare and process graphics and images is currently the subject of active research and development efforts and is being put into practical use.

For example, in three-dimensional graphics, the optical phenomenon when a three-dimensional object is illuminated by a predetermined light source is expressed by a mathematics model and the surface of the object is given shading or lighting or given a pattern based on this model to thereby to generate a more realistic, three-dimensional-like two-dimensional high quality image.

Such computer graphics is being increasingly utilized in CAD/CAM in the development field of science, industry, manufacture, etc. and other various types of fields of application.

Three-dimensional graphics is generally comprised by a geometry sub-system positioned as the front end and a raster sub-system positioned as the back end.

The "geometry sub-system" is the step for performing geometric operation on a position, posture, etc. of a three-dimensional object displayed on a display screen.

In the geometry sub-system, the object is generally handled as an aggregate of a large number of polygons, and geometric operation such as coordinate conversion, clipping, and light source calculation are performed in units of polygons.

On the other hand, the "raster sub-system" is the step for painting each pixel constituting the object.

The rasterizing is realized by for example interpolating the image parameters of all pixels included inside a polygon on the basis of the image parameters found for the vertexes of the polygon.

The image parameters referred to here include color (drawn color) data expressed by a so-called RGB format or the like, a z-value expressing a distance in a depth direction, and so on.

Further, in recent high definition three-dimensional graphics processing, a fog (f)) for causing a perspective feeling, a texture (t) for expressing the feeling of the material and pattern of the object surface to impart realism, etc. are also included as image parameters.

Here, the processing for generating pixels inside a polygon from the vertex information of the polygon is executed by using a linear interpolation technique frequently referred to as a "digital differential analyzer" (DDA).

In the DDA process, the inclination of data to a side direction of the polygon is found from the vertex information, the data on the side is calculated by using this inclination, then the inclination of a raster scan direction (X-direction) is calculated, and the amount of change of the parameter found from this inclination is added to the parameter values of the start point of the scan so as to generate internal pixels.

At this time, there is a method of simultaneously generating a plurality of pixels by scanning in units of regions instead of scanning in units of pixel.

As one of these, there is the method disclosed in Japanese Unexamined Patent Publication (Kokai) No. 2000-338959 (Japanese Patent Application No. 11-152702 (Document 1)).

This method calls for simultaneously processing pixels existing in a square region and transferring the pixels together to a later stage of processing as square region data so as to improve the speed of drawing pixels.

In the above method for processing pixels in units of regions, however, for example, where the region is a square region, there is a disadvantage that sometimes the processed region will not include even one valid pixel.

For example, as shown in FIG. 1, when processing in units of 2×2 regions to judge if center points of the pixels are included in a triangular region, the regions indicated by numerals 1, 2, and 3 in the figure will be scanned but will not include any valid pixels.

In this case, the data is not transferred to the later stage of processing, so the operating efficiency of the later stage of processing will end up falling.

SUMMARY OF THE INVENTION

An object of the present invention is to provide an image processing apparatus able to continuously generate region data, able to eliminate wasteful processing due to invalid regions, and able to efficiently draw an image and a method of the same.

To attain the above object, according to a first aspect of the present invention, there is provided an image processing apparatus for generating pixel data based on information concerning a primitive to be drawn and simultaneously processing pixels existing in a unit region, comprising a large region data generation circuit for receiving information concerning the primitive to be drawn and, when at least one pixel is located inside the primitive in a unit region including a plurality of pixels, generating large region data increased by at least one unit region worth of data; a large region data division circuit for dividing the large region data generated by the large region data generation circuit into region data equivalent to the unit regions and sequentially outputting the divided region data at a predetermined timing; and a processing circuit for performing graphics drawing processing based on the region data of the large region data division circuit.

According to a second aspect of the present invention, there is provided an image processing apparatus for generating pixel data based on information concerning a primitive to be drawn and simultaneously processing pixels existing in a unit region, comprising a large region data generation circuit for receiving the information concerning the primitive to be drawn and, when at least one pixel is located inside the primitive in a unit region including a plurality of pixels, generating large region data increased by at least one unit region worth of data; a large region data storage circuit for storing the large region data generated by the large region data generation circuit; a large region data division circuit for reading the large region data stored in the large region data storage circuit, dividing the read large region data to region data equivalent to the unit regions, and sequentially outputting the divided region data at a predetermined timing; and a processing circuit for performing graphics drawing processing based on the region data of the large region data division circuit.

Preferably, the large region data generation circuit includes a primitive information storage circuit and a pixel inside/outside judgment circuit; the primitive information storage circuit stores information concerning the primitive, judges whether or not the present position of the stored data is inside the primitive, outputs stored data included in a designated large region to the pixel inside/outside judgment circuit where it is inside, and receives and stores the information concerning the primitive and outputs the data of the designated large region to the pixel inside/outside judgment circuit when it is not inside; and the pixel inside/outside judgment circuit performs the inside/outside judgment with respect to the primitive for each pixel in a large region based on the primitive information read from the primitive information storage circuit and generates large region data when at least one pixel is located inside.

More preferably, the large region data generation circuit has a large region movement circuit for moving the large region for the inside/outside judgment of a pixel when informed of the fact that large region data was generated or not generated and outputting designation data indicating the moved large region to the primitive information storage circuit; and the pixel inside/outside judgment circuit informs to the large region movement circuit of the fact that large region data was generated or the fact that a pixel was not located inside the primitive and the large region data was not generated.

Preferably the large region data division circuit includes a region data generation circuit for dividing the generated large region data into region data equivalent to the unit regions and outputting data including a valid pixel among the divided large region data as the region data and a region data storage circuit for storing one or a plurality of region data by the region data generation circuit and outputting the stored region data at a predetermined timing.

According to a third aspect of the present invention, there is provided an image processing method for generating pixel data based on information concerning a primitive to be drawn and simultaneously processing pixels existing in a unit region, comprising a large region data generation step of receiving information concerning the primitive to be drawn and, when at least one pixel is located inside the primitive in a unit region including a plurality of pixels, generating large region data increased by at least one unit region worth of data; a large region data division step of dividing the large region data generated by the large region data generation step into region data equivalent to the unit regions and sequentially outputting the divided region data at a predetermined timing; and a processing step of performing the graphics drawing processing based on the region data according to the large region data division step.

Preferably, the large region data generation step further comprises storing the information concerning the primitive, judges whether or not the present position of the stored data is inside the primitive, supplies the stored data included in a designated large region when it is inside, fetches and stores information concerning the primitive and supplies the data of the designated large region when it is not inside and performs the inside/outside judgment with respect to the primitive for each pixel in the large region based on the supplied primitive information and generates the large region data when at least one pixel is located inside.

More preferably, the large region data generation step further comprises, when it is informed that the large region data was generated or not generated, moving the large region for the inside/outside judgment of a pixel and designating the moved large region as the large region to be processed next.

Preferably the large region data division step includes a region data generation step of dividing the generated large region data into region data equivalent to the unit regions and outputting data including a valid pixel among the divided large region data as the region data and a region data memory step of storing one or a plurality of region data of the region data generation step and outputting the stored region data at a predetermined timing.

According to the present invention, when rasterizing for example various type of data (z, texture coordinates, color, etc.), the apparatus generates large region data increased by at least one unit region worth of data in a large region data generation circuit based on information concerning a primitive when at least one pixel is located inside the primitive in a unit region including a plurality of pixels, divides this large region data into usual region data equivalent to the unit regions, and outputs it to a later stage processing circuit.

Specifically, the large region data generation circuit stores information concerning a primitive in a primitive information storage circuit.

Next, the apparatus judges whether or not the present position of the data stored in the primitive information storage circuit is inside the primitive.

The apparatus receives information concerning the primitive as set-up data from a former stage circuit when it judges that the stored data is not inside the primitive and stores the received information concerning the primitive in the primitive information storage circuit.

The pixel inside/outside judgment circuit reads data corresponding to the large region designated by a large region movement circuit from the stored data of the primitive information storage circuit.

The pixel inside/outside judgment circuit performs the inside/outside judgment for each pixel in the large region, specifically, judges whether at least one pixel exists inside the primitive.

Here, there is at least one pixel inside the primitive, therefore the pixel inside/outside judgment circuit generates the large region data and outputs it to the large region data storage circuit.

Then, the pixel inside/outside judgment circuit informs the large region movement circuit that the large region data was generated and output.

When informed by the pixel inside/outside judgment circuit that the large region data was generated, the large region movement circuit moves the large region for the inside/outside judgment of the pixel and outputs data indicating the moved large region to the primitive information storage circuit.

Further, when the large region data generated by the large region data generation circuit is stored in the large region data storage circuit, this stored data is read out to the large region data division circuit.

The large region data division circuit divides the large region data read from the large region data storage circuit by the region data generation circuit into the usual region data equivalent to the unit square regions.

It then outputs data including a valid pixel among the divided large region data as the region data to the region data storage circuit.

By this, a plurality of region data of the region data generation circuit are stored at predetermined addresses of the region data storage circuit.

Then, the region data stored by the region data storage circuit is sequentially output to the later stage processing circuit at a predetermined timing.

BRIEF DESCRIPTION OF THE DRAWINGS

These and other objects and features of the present invention will become clearer from the following description of the preferred embodiments given with reference to the attached drawings, wherein:

FIG. 5A and FIG. 5B are views for explaining the functions of a triangle DDA circuit according to the present embodiment;

FIGS. 12A to 12C are views of the image of actual texture mapping in the texture engine circuit according to the present embodiment;

FIGS. 13A to 13C are views for conceptually explaining a method of storage of display data and depth data and texture data in a graphics memory according to the present embodiment; and FIGS. 14A to 14C are views for explaining the operation of a triangle DDA circuit of the image processing apparatus of FIG. 2.

DESCRIPTION OF THE PREFERRED EMBODIMENTS

Preferred embodiments of the present invention will be described in detail below while referring to the attached figures.

Below, an explanation will be given of a three-dimensional computer graphics system applicable to a personal computer etc. for displaying a desired three-dimensional image of any three-dimensional object model on a cathode ray tube (CRT) or other display at a high speed.

Figure 1:
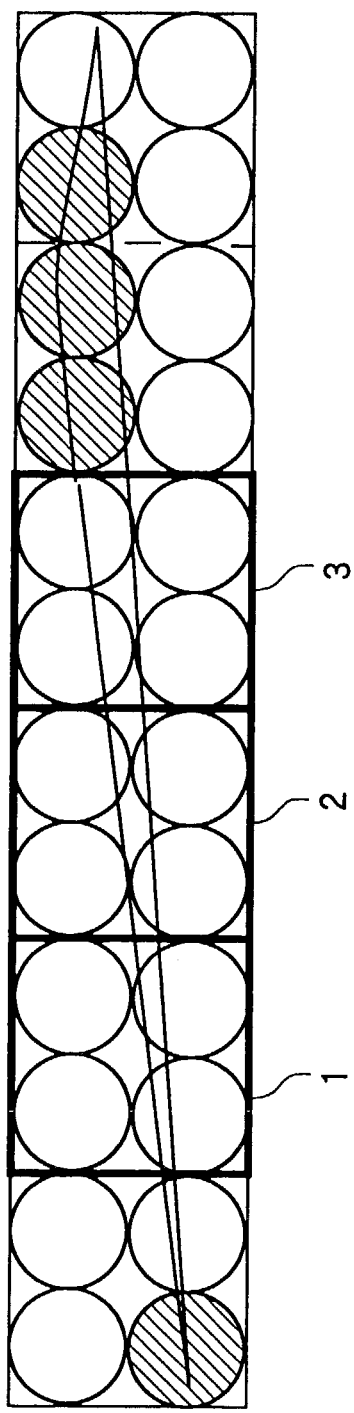
FIG. 1 is a view for explaining a conventional problem.
Figure 2:
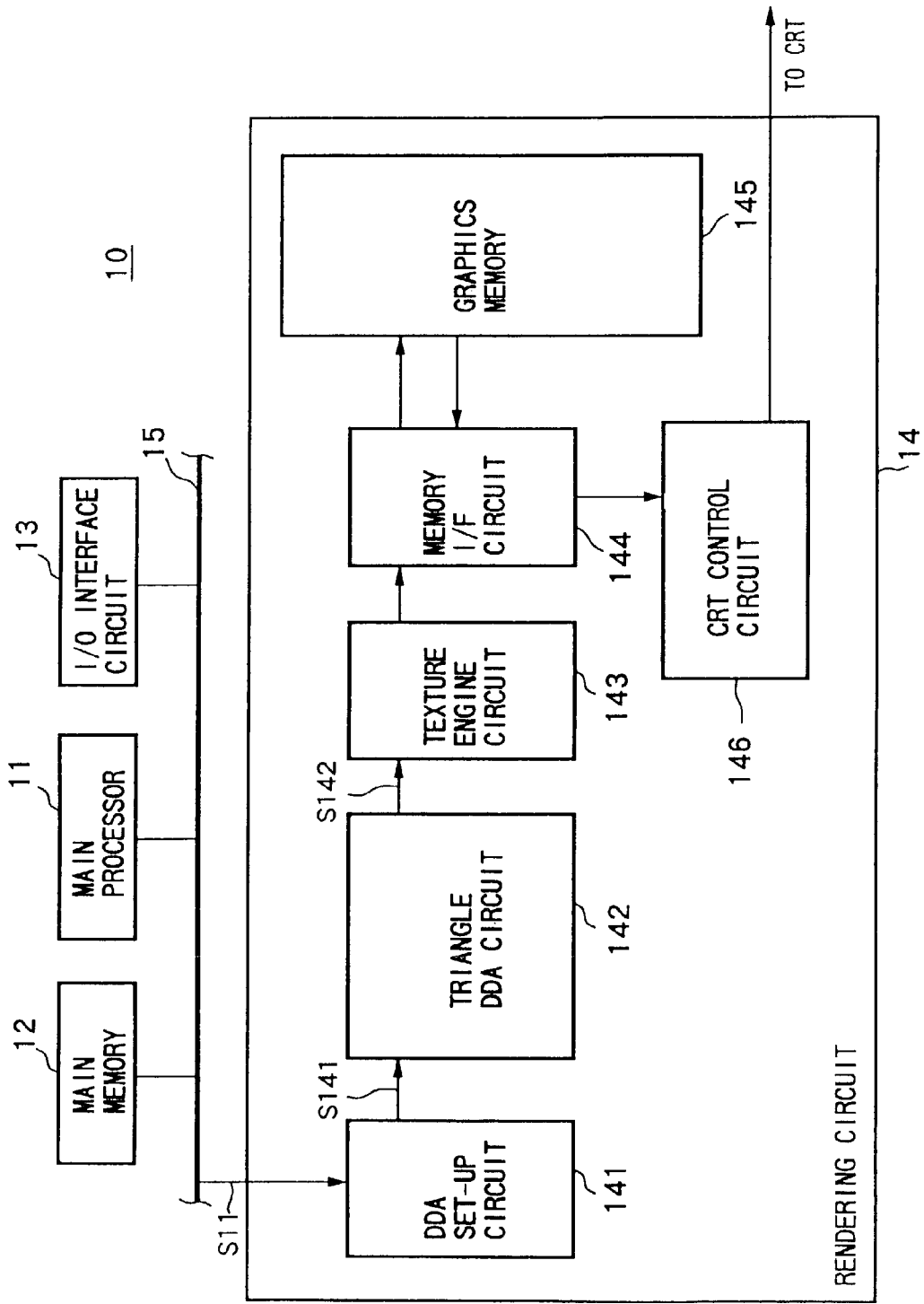
FIG. 2 is a view of the system configuration of a three-dimensional computer graphics system comprising an image processing apparatus according to the present invention.

FIG. 2 is a view of the system configuration of a three-dimensional computer graphics system 10 comprising an image processing apparatus according to the present invention.

The three-dimensional computer graphics system 10 is a system for polygon rendering for expressing a three-dimensional model as a combination of triangles (polygons) as unit graphics, determining the color of each pixel of the display screen by drawing these polygons, and displaying the result on a display.

The three-dimensional computer graphics system 10 expresses a three-dimensional object by using the (x, y) coordinates expressing a position on a plane and also a z-coordinate expressing the depth and specifies any point in a three-dimensional space by the three coordinates of (x, y, z).

As shown in FIG. 2, the three-dimensional computer graphics system 10 comprises a main processor 11, a main memory 12, an I/O interface circuit 13, and a rendering circuit 14 connected via a main bus 15.

Below, an explanation will be given of functions of the components.

The main processor 11 reads required graphics data from the main memory 12 in accordance with for example the state of progress of the application and performs the coordinate conversion, clipping, lighting, and other geometry processing with respect to this graphics data to generate the polygon rendering data.

The main processor 11 outputs the polygon rendering data S11 via the main bus 15 to the rendering circuit 14.

The I/O interface circuit 13 receives as input control information of movement from the outside, the polygon rendering data, etc. according to need and outputs this via the main bus 15 to the rendering circuit 14.

The polygon rendering data input to the rendering circuit 14 includes the data of (x, y, z, R, G, B, s, t, q) of the three vertexes of each polygon.

Here, the (x, y, z) data indicates the three-dimensional coordinates of a vertex of a polygon, and the (R, G, B) data indicates the luminance values of red, green, and blue at the three-dimensional coordinates.

Among the (s, t, q) data, (s, t) indicates the homogeneous coordinates of the corresponding texture, and q indicates a homogeneous term. Here, "s/q" and "t/q" are multiplied by texture sizes USIZE and VSIZE to obtain the actual texture coordinate data (u, v).

The texture data stored in the graphics memory (specifically a texture buffer described later) of the rendering circuit 14 is accessed using the texture coordinate data (u, v).

Namely, the polygon rendering data comprises the physical coordinate values of the vertexes of a triangle, the colors of the vertexes, and the texture data.

Below, a detailed explanation will be given of the rendering circuit 14.

As shown in FIG. 2, the rendering circuit 14 has a digital differential analyzer (DDA) set-up circuit 141 as an initialization operational block for a linear interpolation operation, a triangle DDA circuit 142 as a linear interpolation block, a texture engine circuit 143, a memory interface (I/F) circuit 144, a graphics memory 145 comprised of for example a DRAM, and a CRT control circuit 146. The processing circuit is configured by the texture engine circuit 143 and the memory interface (I/F) circuit 144.

The rendering circuit 14 in the present embodiment is comprised of a logic circuit and the graphics memory 145 for storing at least the display data and texture data provided on a single semiconductor chip.

Below, the configurations and functions of the blocks of the rendering circuit 14 will be sequentially explained with reference to the drawings.

Before linearly interpolating the values of the vertexes of a triangle on the physical coordinate system in the later stage triangle DDA circuit 142 to find the color and depth information of each pixel inside the triangle, the DDA set-up circuit 141 performs the set-up operation for finding the difference from sides of the triangle in the horizontal direction etc. for the (z, R, G, B, s, t, q) data indicated by the polygon rendering data S11.

This set-up operation specifically calculates a change of the value to be found in a case of a unit length of movement by using the value of the start point and the value of the end point and a distance between the start point and the end point.

The DDA set-up circuit 141 outputs set-up data S141 (including the calculated change data) as information concerning the primitive to the triangle DDA circuit 142.

Figure 3:
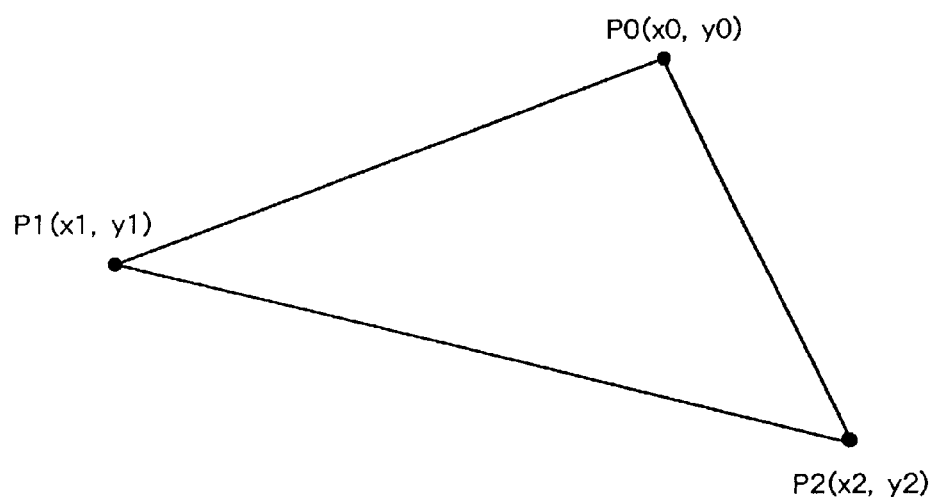
FIG. 3 is a view for explaining functions of a DDA set-up circuit according to the present embodiment.

The functions of the DDA set-up circuit 141 will be further explained with reference to FIG. 3.

As explained above, the main processing of the DDA set-up circuit 141 is to find the change inside a triangle comprised of three given vertexes P0 (x0, y0), P1 (x1, y1), and P2 (x2, y2) for various information (color and texture coordinates) at the vertexes after the prior stage geometry processing and settling down to physical coordinates and to calculate the basic data of the later stage linear interpolation.

A triangle is basically drawn by drawing individual pixels, but it is necessary to find the first values at the start point of drawing for this purpose.

The various information at the first drawn point are the values obtained by multiplication with the change in the horizontal direction in the horizontal distance from a vertex to the first drawn point plus the values obtained by multiplication with the change in the vertical direction in the vertical distance. Once the values on one whole lattice inside the object triangle are found, it becomes possible to find values at the other lattice points inside the object target triangle by whole multiples of the changes.

In each vertex data of the triangle, for example the x, y coordinates consist of 16 bits, the z-coordinate consists of 24 bits, each of the RGB color values consists of 12 bits (=8+4), each of the s, t, q texture coordinates consists of a 32-bit floating decimal value.

Note that this DDA set-up circuit 141 is implemented using ASIC rather than by a DSP circuit as in the conventional case.

Figure 4:
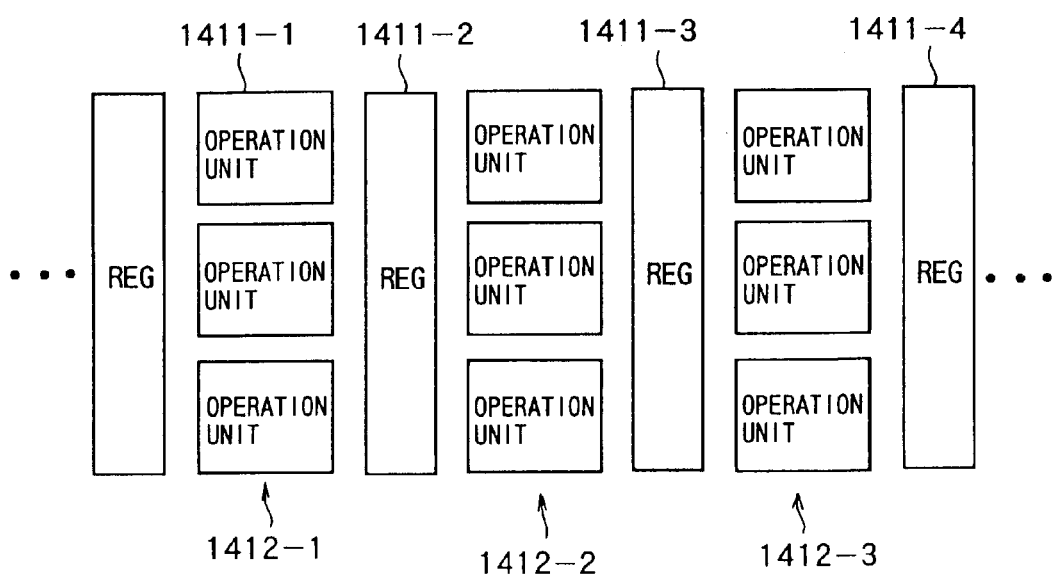
FIG. 4 is a view of an example of the configuration of a DDA set-up circuit according to the present embodiment.

Specifically, as shown in FIG. 4, it is configured by a full data path logic obtained by inserting processing unit groups 1412-1 to 1412-3 each comprised of a plurality of operation units arranged in parallel among registers 1411-1 to 1411-4 arranged in multiple stages, in other words, as a synchronous pipeline type time parallel structure.

The triangle DDA circuit 142 calculates the linearly interpolated (z, R, G, B, s, t, q) data at each pixel inside the triangle based on the set-up data S141 (including the change data) of the information concerning the primitive input from the DDA set-up circuit 141.

The triangle DDA circuit 142 outputs the (x, y) data of each pixel and the (z, R, G, B, s, t, q) data at the (x, y) coordinates as the DDA data (interpolated data) S142 to the texture engine circuit 143.

Namely, the triangle DDA circuit 142 performs rasterization for interpolating image parameters of all pixels included inside a polygon based on the image parameters found for the vertexes of the polygon.

Specifically, the triangle DDA circuit 142 rasterizes the various data (z, texture coordinates, colors, etc.)

As shown in FIG. 5A, the triangle DDA circuit 142 according to the present embodiment generates large region data including 2×4=8 pixels obtained by multiplying a unit square region USR by n (n is an integer of 2 or more, n=2 in the present embodiment) based on the set-up data S141 including the change data input from the DDA set-up circuit 141 when at least one pixel is located inside the primitive (triangle in the present embodiment) in a unit square region USR including a plurality of pixels, for example 2×2=4 pixels, in other words, when valid region data located inside the triangle exists in the unit square region USR (ST1); stores the large region data (ST2); further divides the stored large region data into region data equivalent to the unit square regions (ST3); and outputs the result as the DDA data S142 to the texture engine circuit 143 (ST4).

Conventionally, as shown in FIG. 5B, when simply generating and outputting the region data, the valid region data could not always be output, but in contrast, in the triangle DDA circuit 142 according to the present embodiment, a valid region is reliably included in the large region data, so the region data can be continuously generated and efficient drawing of an image is realized.

Below, an explanation will be given of a concrete example of the configuration of the triangle DDA circuit 142 having the large region data generation and divided data outputting functions with reference to the drawings.

Figure 6:
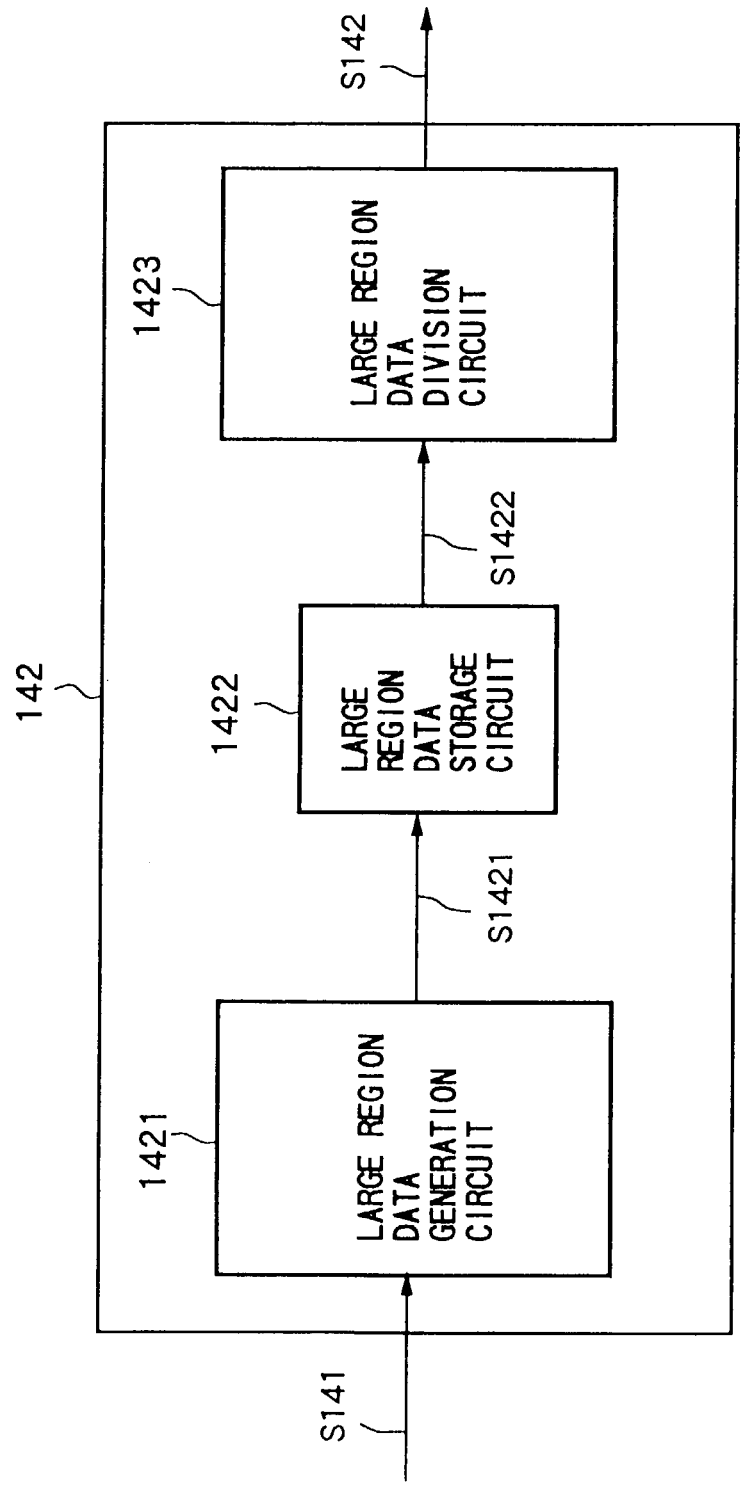
FIG. 6 is a block diagram of the principal configuration of a triangle DDA circuit according to the present embodiment.

FIG. 6 is a block diagram of the principal configuration of the triangle DDA circuit 142 according to the present embodiment.

The present triangle DDA circuit 142 has as principal components, as shown in FIG. 6, a large region data generation circuit 1421 for receiving the set-up data S141 of the DDA set-up circuit 141 and generating large region data increased by at least one unit square regions worth of data, a large region data storage circuit 1422 for storing large region data S1421 generated at the large region data generation circuit 1421, and a large region data division circuit 1423 for reading large region data S1422 stored in the large region data storage circuit 1422, dividing it into sections each having a size of the usual region data, that is, the size of a unit square region, and outputting the result as the DDA data S142 to the texture engine circuit 143.

Figure 7:
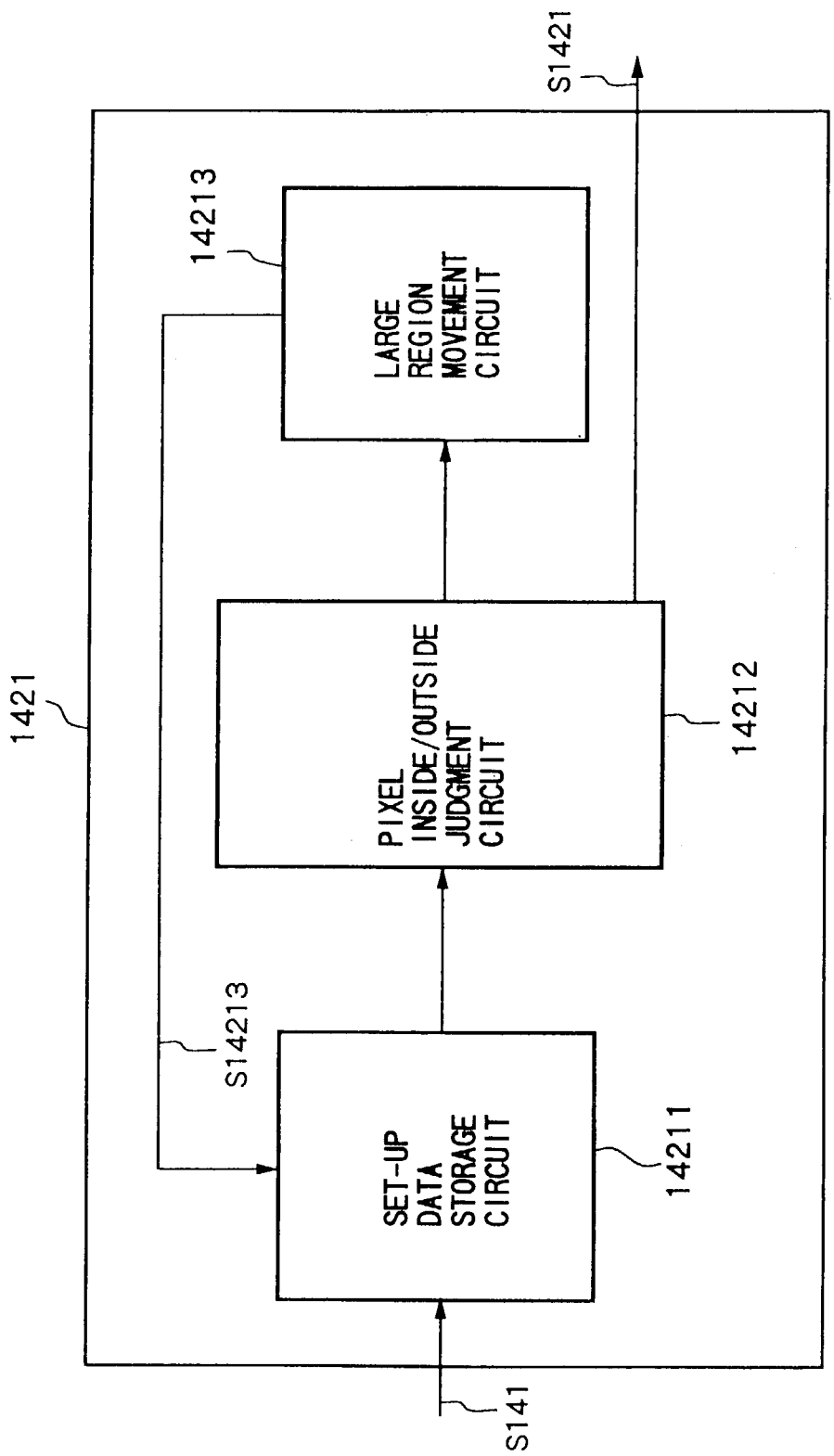
FIG. 7 is a block diagram of an example of the concrete configuration of a large region data generation circuit comprising a principal part of the triangle DDA circuit according to the present embodiment.

FIG. 7 is a block diagram of an example of the concrete configuration of the large region data generation circuit 1421 comprising a principal part of the triangle DDA circuit according to the present embodiment.

The present large region data generation circuit 1421 has, as shown in FIG. 7, a set-up data storage circuit 14211 as the primitive information storage circuit, a pixel inside/outside judgment circuit 14212, and a large region movement circuit 14213.

The set-up data storage circuit 14211 stores the set-up data S141 by the DDA set-up circuit 141, judges whether or not the present position of the stored data is inside the triangle, outputs the stored data to the pixel inside/outside judgment circuit 14212 where it is located inside, while receives the set-up data S141 from the DDA set-up circuit 141, newly stores this set-up data, and outputs the data of the large region designated by the large region movement circuit 14213 to the pixel inside/outside judgment circuit 14212 where it is not located inside.

The pixel inside/outside judgment circuit 14212 performs the inside/outside judgment for the triangle for each pixel in the square large region having a size set in advance, for example a 2×4 square large region obtained by doubling for example a 2×2 unit square region USR in the x-direction based on the set-up data stored in the set-up data storage circuit 14211 and, when at least one pixel exists inside, generates the large region data S1421 and outputs it to the large region data storage circuit 1422.

Further, the pixel inside/outside judgment circuit 14212 informs the large region movement circuit 14213 of the fact that the large region data was generated and output or the fact that pixel did not exist inside the triangle and the large region data was not generated.

When informed by the pixel inside/outside judgment circuit 14212 that the large region data was generated or not generated, the large region movement circuit 14213 moves the large region for the inside/outside judgment of pixels to for example an adjacent large region and outputs data S14213 indicating the moved large region to the set-up data storage circuit 14211.

Figure 8:
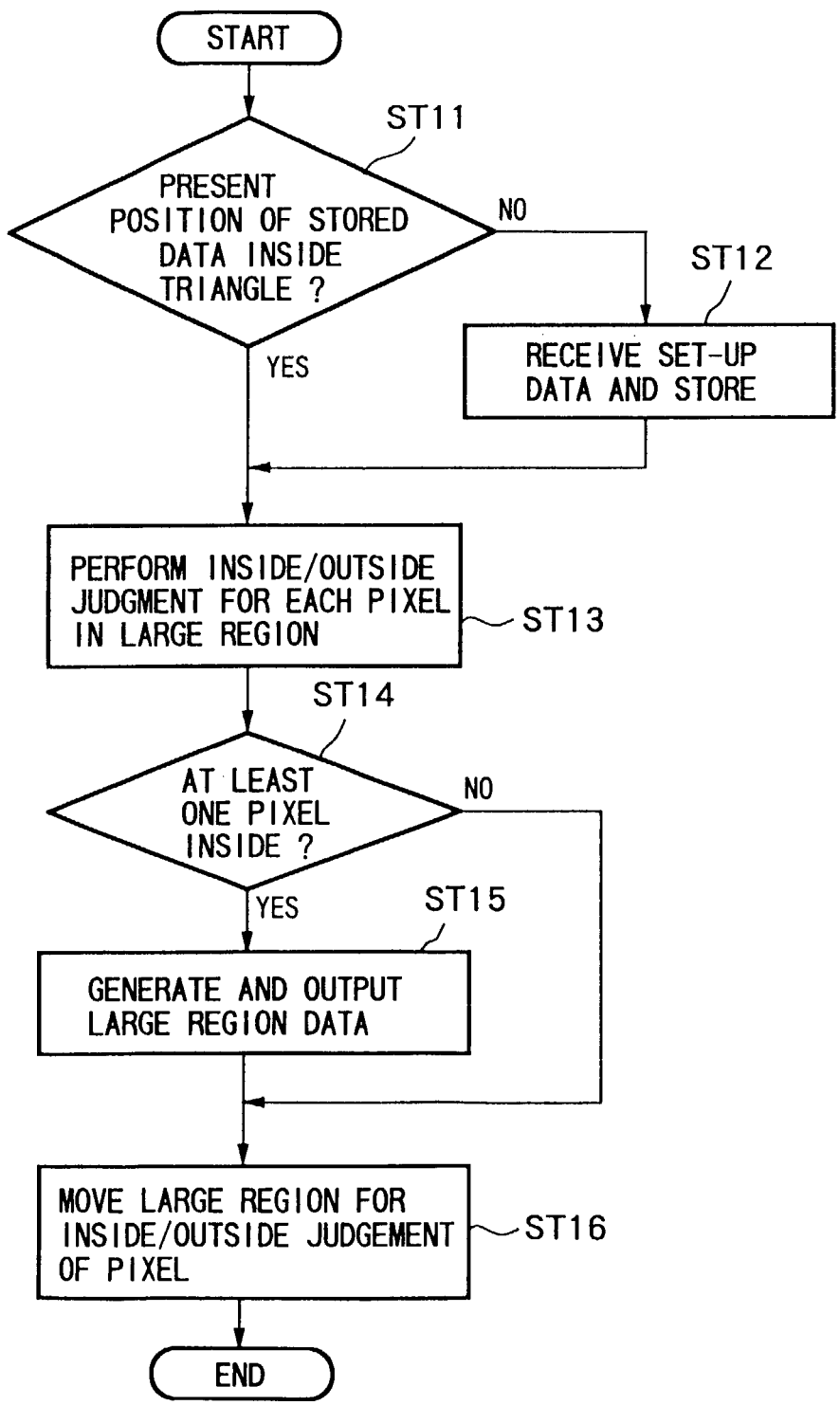
FIG. 8 is a flowchart for explaining an operation of a large region data generation circuit having the configuration of FIG. 7.

FIG. 8 is a flowchart for explaining the operation of the large region data generation circuit 1421 having the configuration of FIG. 7.

As shown in FIG. 8, the large region data generation circuit 1421 performs the processing of the following steps ST11 to ST16.

At step ST11, it is judged whether or not the present position of the data stored in the set-up data storage circuit 14211 is inside the triangle.

Here, when it is judged that no stored data exists inside the triangle, the routine proceeds to the processing of step ST12, while when it is judged that data exists inside the triangle, the routine proceeds to the processing of step ST13.

At step ST12, the set-up data is received from the DDA set-up circuit 141, the received set-up data is newly stored in the set-up data storage circuit 14211, then the routine proceeds to the processing of step ST13.

At step ST13, the data corresponding to the large region designated by the large region movement circuit 14213 is read from the stored data of the set-up data storage circuit 14211 to the pixel inside/outside judgment circuit 14212, whether each pixel is inside or outside the large region is judged by the pixel inside/outside judgment circuit 14212, then the routine proceeds to the processing of step ST14.

At step ST14, it is judged whether or not at least one pixel exists inside the triangle.

Here, when it is judged that a pixel exists inside, the routine proceeds to the processing of step ST15, while when it is judged that no pixel exists inside, the routine proceeds to the processing of step ST16.

At step ST15, at least one pixel exists inside the triangle, therefore the pixel inside/outside judgment circuit 14212 generates the large region data S1421 and outputs it to the large region data storage circuit 1422, then the routine proceeds to the processing of step ST16.

Then, the pixel inside/outside judgment circuit 14212 informs the large region movement circuit 14213 that the large region data was generated and output at step ST15 or that no pixel existed inside the triangle and the large region data was not generated at step ST14.

At step ST16, when informed by the pixel inside/outside judgment circuit 14212 that the large region data was generated or not generated, the large region movement circuit 14213 moves the large region for the inside/outside judgment of the pixel and outputs data S14213 indicating the moved large region to the set-up storage circuit 14211.

Figure 9:
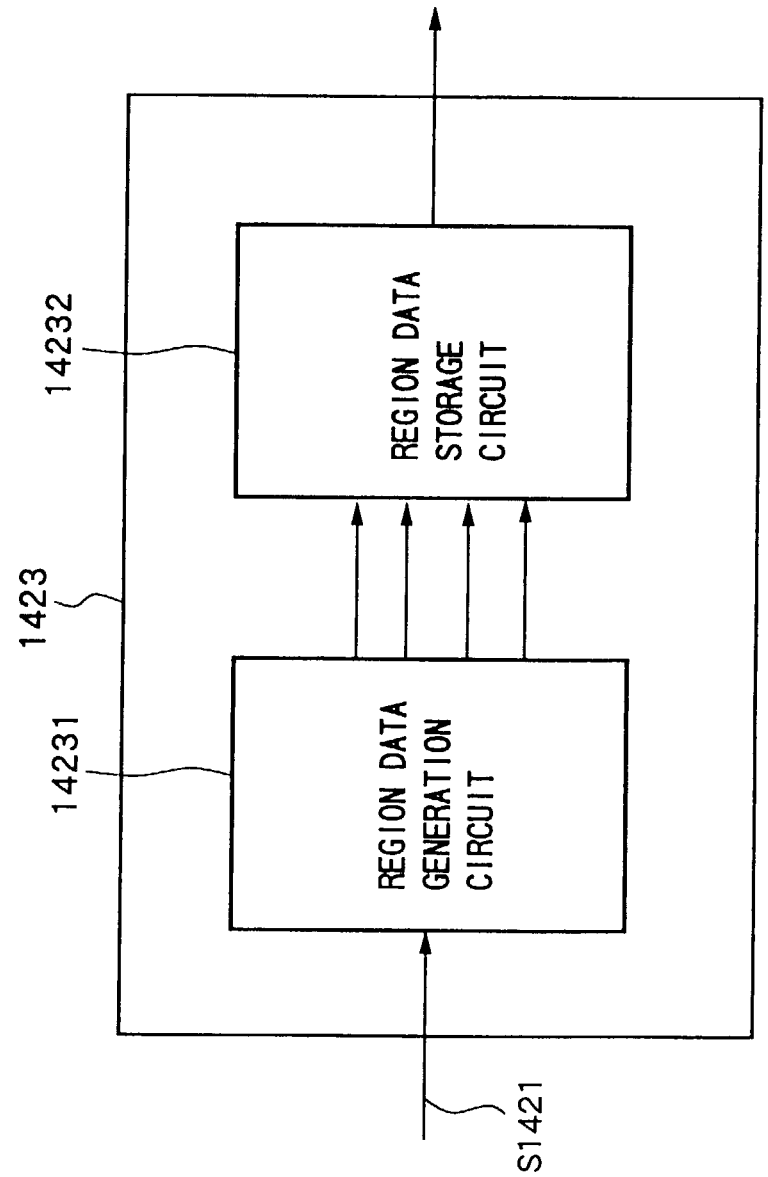
FIG. 9 is a block diagram of an example of the concrete configuration of a large region data division circuit comprising a principal part of a triangle DDA circuit according to the present embodiment.

FIG. 9 is a block diagram of an example of the concrete configuration of the large region data division circuit 1423 comprising a principal part of the triangle DDA circuit according to the present embodiment.

The present large region data division circuit 1423 has, as shown in FIG. 9, a region data generation circuit 14231 and a region data storage circuit 14232.

The region data generation circuit 14231 reads the large region data S1422 stored in the large region data storage circuit 1422, divides this large region data into region data equivalent to the unit square regions (for example divides it into two), and outputs for example the data including a valid pixel among the divided large region data as the region data to the region data storage circuit 14232.

The region data storage circuit 14232 stores the region data by the region data generation circuit 14231.

Figure 10:
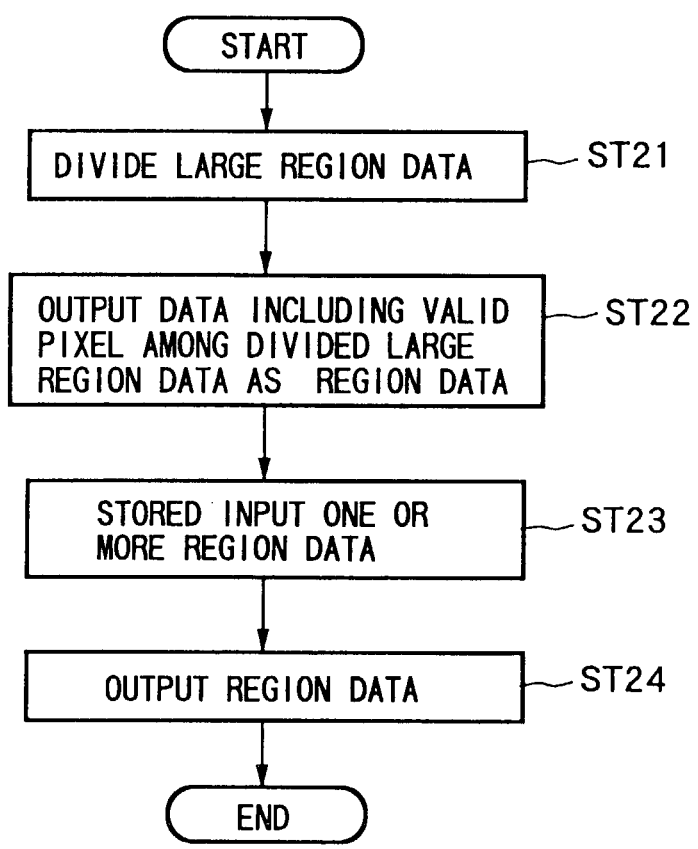
FIG. 10 is a flowchart for explaining the operation of a large region data division circuit having the configuration of FIG. 9.

FIG. 10 is a flowchart for explaining the operation of the large region data division circuit 1423 having the configuration of FIG. 9.

As shown in FIG. 10, the large region data division circuit 1423 performs the processing of the following steps ST21 to ST24.

At step ST21, the large region data S1422 read from the large region data storage circuit 1422 by the region data generation circuit 14231 is divided into region data equivalent to the unit square regions, then the routine proceeds to the processing of step ST22.

At step ST22, the data including a valid pixel among the divided large region data is output as the region data to the region data storage circuit 14232, then the routine proceeds to the processing of step ST23.

At step ST23, one or more region data by the region data generation circuit 14231 is stored at predetermined addresses of the region data storage circuit 14232, then the routine proceeds to the processing of step ST24.

At step ST24, the region data stored by the region data storage circuit 14232 is output as the DDA data S142 to the texture engine circuit 143 at a predetermined timing.

The texture engine circuit 143 calculates the "s/q" and "t/q", calculates the texture coordinate data (u, v), reads out the (R, G, B) data from the graphics memory 145, sequentially.

Note that the texture engine circuit 143 simultaneously performs processing for a plurality of (for example 4 or 8) pixels located in for example a predetermined square in parallel.

The texture engine circuit 143 performs operation for dividing the s data by the q data and operation for dividing the t data by the q data for the (s, t, q) data indicated by the DDA data S142.

The texture engine circuit 143 is provided with for example exactly the number of not illustrated division circuits as the number of pixels to be processed in parallel (for example 8) and simultaneously divides "s/q" and "t/q" for 8 pixels. Further, it is also possible to mount them for interpolation operation processing from a representative point among the 8 pixels.

Further, the texture engine circuit 143 multiplies the "s/q" and "t/q" of the division results by texture sizes USIZE and VSIZE to generate the texture coordinate data (u, v).

Further, the texture engine circuit 143 outputs a read request including the generated texture coordinate data (u, v) to the graphics memory 145 via the memory I/F circuit 144 and reads the texture data stored in the texture buffer included in the graphics memory 145 via the memory I/F circuit 144 to thereby obtain the (R, G, B) data stored at the texture address corresponding to the (s, t) data.

The texture engine circuit 143 generates the pixel data by for example multiplying the (R, G, B) data of the read (R, G, B) data and the (R, G, B) data included in the DDA data S142 from the prior stage triangle DDA circuit 142 with each other.

The texture engine circuit 143 finally outputs this pixel data as the color value of the pixel to the memory I/F circuit 144.

Note that the texture buffer included in the graphics memory 145 stores MIPMAP (plural resolution textures) and other texture data corresponding to a plurality of reduction rates. Here, which texture data of which reduction rate is to be used is determined in units of triangles by using a predetermined algorithm.

The texture engine circuit 143 directly uses the (R, G, B) data read from the texture buffer in the case of the full color mode.

On the other hand, the texture engine circuit 143 transfers the data of a color index table prepared in advance to a temporary storage buffer comprised by a built-in SRAM or the like from a texture color look-up table (CLUT) buffer in the case of the index color mode and obtains the (R, G, B) data corresponding to the color index read from the texture buffer by using this color look-up table.

For example, when the color look-up table is comprised by a SRAM, if inputting the color index to an address of the SRAM, actual (R, G, B) data appears at the output thereof.

Here, so-called texture mapping will be further explained with reference to FIG. 11 and FIG. 12A to FIG. 12C.

Figure 11:
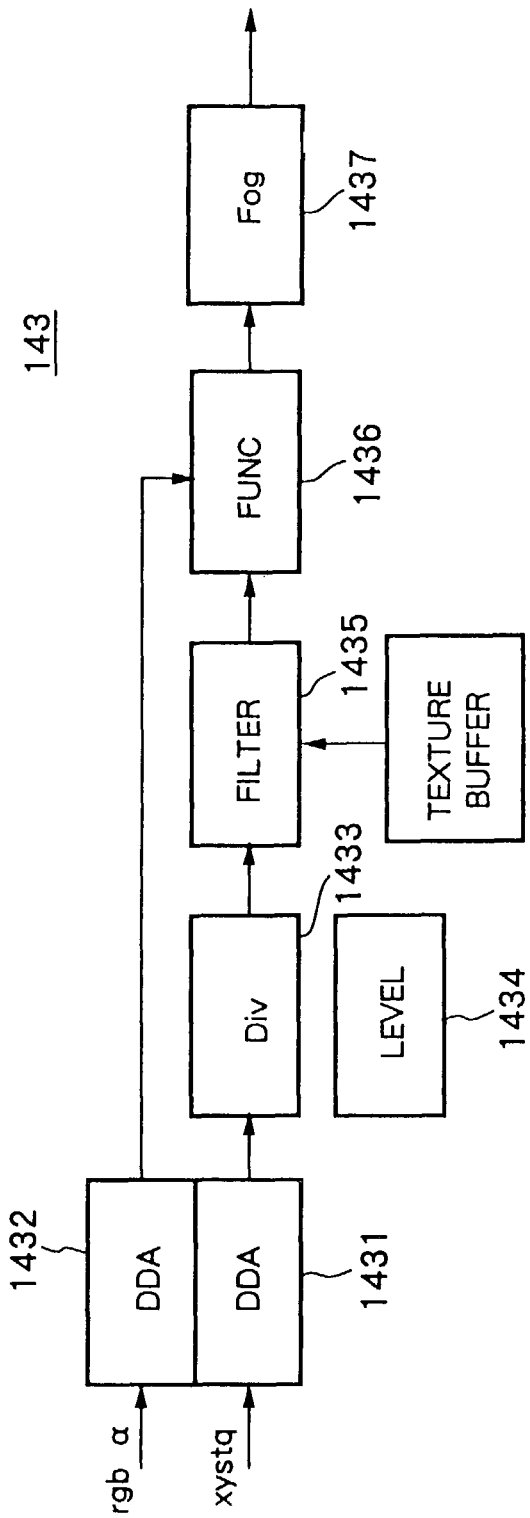
FIG. 11 is a block diagram of an example of the configuration of a texture mapping circuit in a texture engine circuit according to the present embodiment.

FIG. 11 is a block diagram of an example of the configuration of the texture mapping circuit in the texture engine circuit 143, and FIGS. 12A to 12C are views showing an image of an actual texture mapping.

This texture mapping circuit has DDA circuits 1431 and 1432, a texture coordinate calculation circuit (Div) 1433, a MIPMAP level calculation circuit 1434, a filter circuit 1435, a first combining circuit (FUNC) 1436, and a second combining circuit (FOG) 1437.

In this texture mapping circuit, as shown in FIG. 12A, the DDA circuits 1431 and 1432 use the homogeneous coordinates s, t, q of the texture linearly interpolated inside the triangle and convert them to an actual address of the texture in Descartes coordinates (division by q).

Further, where performing MIPMAP etc., the MIPMAP level calculation circuit 1434 calculates the MIPMAP level. Then, as shown in FIG. 12B, the texture coordinate calculation circuit 1433 calculates the texture coordinates.

Further, the filter circuit 1435 reads the texture data of each level from the texture buffer included in the graphics memory 145 and performs point sampling using the same as it is, bi-linear (4 vicinity) interpolation, tri-linear interpolation, etc.

The texture color obtained there is processed as follows: Namely, the first combining circuit 1436 combines the input object color and the texture color, then the second combining circuit 1437 further combines fog color with the result to determine the color of the pixel to be finally drawn.

The memory I/F circuit 144 compares the z-data corresponding to the pixel data S143 input from the texture engine circuit 143 and the z-data stored in the z-buffer included in the graphics memory 145, judges whether or not the image drawn by the input pixel data is located closer (to the viewing point) than the image written in the graphics memory 145 (display buffer) the previous time, and, where it is located closer, updates the z-data stored in the z-buffer by the z-data corresponding to the image data.

Further, the memory I/F circuit 144 writes the (R, G, B) data in the graphics memory 145 (display buffer).

Further, the memory I/F circuit 144 calculates the memory block of the graphics memory 145 storing the texture data corresponding to the texture address at the pixel to be drawn from now on from that texture address and issues the read request to only that memory block to thereby read the texture data.

In this case, a memory block not holding the corresponding texture data is not accessed for reading the texture data, so it has become possible to provide a longer access time for the drawing.

The memory I/F circuit 144, in the same way in drawing, reads the pixel data from the corresponding address for a modify write operation to the memory block of the graphics memory 145 storing the pixel data corresponding to the address of the pixel to be drawn from now on and writes back the same to the same address after modification.

When performing hidden plane processing, it reads the depth data from the corresponding address for a modify write operation to the memory block storing the depth data corresponding to the address of the pixel to be drawn from now on as well and, if necessary, writes back the same to the same address after modification.

Further, when receiving a read request including the generated texture coordinate data (u, v) for the graphics memory 145 from the texture engine circuit 143, the memory I/F circuit 144 reads the (R, G, B) data stored in the graphics memory 145.

Further, when receiving a request for reading the display data from the CRT control circuit 146, the memory I/F circuit 144 reads the display data in certain amounts, for example, in units of 8 pixels or 16 pixels, from the graphics memory 145 (display buffer) in response to this request.

The memory I/F circuit 144 accesses (writes into or reads from) the graphics memory 145, but the write route and read route are configured as different routes.

Namely, in the case of writing, a write address ADRW and write data DTW are processed in a write system circuit and written into the graphics memory 145. In the case of reading, they are processed at a read system circuit and read from the graphics memory 145.

Further, the memory I/F circuit 144 accesses the graphics memory 145 in units of for example 16 pixels based on an addressing of a predetermined interleave system.

In such transfer of the data with the memory, by performing plural parallel processing for the above processing, the drawing performances can be improved.

Particularly, by providing the same circuits for the triangle DDA portion and the texture engine portion in a parallel execution format (spatially parallel) or by finely inserting pipelines (temporally parallel), a plurality of pixels are simultaneously calculated.

In the memory blocks of the graphics memory 145, adjacent portions in the display region are arranged so as to become different memory blocks as will be explained later. Therefore, simultaneous processing can be carried out on a plane when generating a plane such as a triangle, so the probability of operation of each memory block becomes very high.

The graphics memory 145 acts as the texture buffer, display buffer, z-buffer, and texture CLUT (color look-up table) buffer.

Further, the graphics memory 145 is divided into a plurality of, for example four, modules having the same functions.

Further, the graphics memory 145 is made able to store more texture data by storing indexes of index colors and the color look-up table values for this purpose in the texture CLUT buffer.

The indexes and color look-up table values are used for the texture processing as explained above.

Namely, usually, a texture element is usually expressed by 24 bits in total of R, G, B each consisting of 8 bits, but the amount of data swells due to this. Therefore, one color is selected from among for example 256 colors selected in advance, and the data thereof is used for the texture processing. Due to this, if there are 256 colors, each texture element can be expressed by 8 bits. A conversion table from the indexes to the actual colors becomes necessary, but the higher the resolution of the texture, the more compact the texture data can be made.

By this, compression of the texture data becomes possible, and efficient utilization of the built-in memory becomes possible.

Further, the graphics memory 145 stores the depth information of the object to be drawn in order to perform the hidden plane processing simultaneously and parallel with the drawing.

Note that, as the method of storage of the display data and depth data and texture data, for example, the display data is continuously stored at a predetermined position of the memory block, for example, from the header, the depth data is stored next, and the texture data is stored in a continuous address space for every type of the texture in the remaining empty region.

Conceptually explaining this with reference to the drawings, as shown in FIGS. 13A to 13C, the display data and the depth data are stored in for example a 24-bit width in a region indicated by FB in the figure from a position indicated by a so-called base pointer (BP), while the texture data is stored in a region of 8-bit width of the remaining empty region as indicated by TB in the figure. This means formation of a unified memory of the display data and texture data.

Due to this, the texture data can be more efficiently stored.

As described above, after the predetermined processing in the DDA set-up circuit 141, the triangle DDA circuit 142, the texture engine circuit 143, the memory I/F circuit 144, etc., the final memory access becomes the pixel, that is, the drawn picture cell element.

The CRT control circuit 146 generates a display address for displaying the data on a not illustrated CRT in synchronization with given horizontal and vertical synchronization signals and outputs a request for reading the display data from the display buffer included in the graphics memory 145 to the memory I/F circuit 144.

In response to this request, the memory I/F circuit 144 reads the display data in certain amounts from the graphics memory 145 (display buffer).

The CRT control circuit 146 includes for example an FIFO circuit for storing the display data read from the graphics memory 145 and generates index values of RGB at predetermined time intervals.

The CRT control circuit 146 stores the R, G, B data corresponding to the index values, transfers the R, G, B data of the digital format corresponding to the index values of RGB which are generated to a not illustrated digital/analog (D/A) converter, and generates the R, G, B data of the analog format.

The CRT control circuit 146 outputs these generated R, G, B data to a not illustrated CRT.

Next, an explanation will be given of the operation by the above configuration.

Note that, in this explanation, the operation of the triangle DDA circuit 142 will be explained with reference to FIGS. 14A to 14C.

In FIGS. 14A to 14C, the upper side in the figure above the solid line shows the processing of the large region data generation circuit 1421, while the lower side shows the processing of the large region data division circuit 1423.

In the three-dimensional computer graphics system 10, the graphics drawing and other data is given from the main memory 12 of the main processor 11 or from the I/O interface circuit 13 for receiving graphics data from the outside via the main bus 15 to the rendering circuit 14.

Note that, according to need, the graphics drawing and other data is subjected to coordinate conversion, clipping, lighting, and other geometry processing in the main processor 11 etc.

After geometry processing, the graphics data becomes the polygon rendering data S11 comprised by the vertex coordinates x, y, z of the three vertexes of the triangle, luminance values R, G, B, and the texture coordinates s, t, q corresponding to the pixel to be drawn.

This polygon rendering data S11 is sequentially transferred to the DDA set-up circuit 141 of the rendering circuit 14.

The DDA set-up circuit 141 generates change data indicating the difference from the sides of the triangle in the horizontal direction etc. based on the polygon rendering data S11.

Specifically, the value of the start point and value of the end point and the distance therebetween are used to calculate the amount of change of the value to be found in the case of movement by a unit length and the result output as the set-up data S141 including the change data to the triangle DDA circuit 142.

The triangle DDA circuit 142 uses the set-up data S141 including the change data to calculate the linearly interpolated (z, R, G, B, s, t, q) data at each pixel inside the triangle.

Then, the triangle DDA circuit 142 outputs this calculated (z, R, G, B, s, t, q) data and (x, y) data at the vertexes of the triangle as the DDA data S142 to the texture engine circuit 143.

Namely, the triangle DDA circuit 142 performs rasterization for interpolation of the image parameters (z, texture coordinate, color, etc.) for all pixels included inside the polygon based on the image parameters found for the vertexes of the polygon.

Then, when rasterizing the various data (z, texture coordinate, color, etc.), the triangle DDA circuit 142 generates and stores large region data including 2×4=8 pixels obtained by for example doubling a unit square region USR in the x-direction based on the set-up data S141 when at least one pixel is located inside the triangle in a unit square region USR including a plurality of pixels, for example 2×2=4 pixels, and further divides the stored large region data to usual region data equivalent to the unit square regions and outputs the result as the DDA data S142 to the texture engine circuit 143.

Specifically, first, the processing shown in FIG. 14A is carried out.

Namely, the large region data generation circuit 1421 stores the set-up data S141 in the set-up data storage circuit 14211.

Then, it judges if the present position of the data stored in the set-up data storage circuit 14211 is inside the triangle.

Here, where it judges that the present position is not inside the triangle, it receives the set-up data from the DDA set-up circuit 141 and newly stores the received set-up data in the set-up data storage circuit 14211.

Here, data corresponding to a large region designated by the large region movement circuit 14213 is read from the stored data of the set-up data storage circuit 14211 to the pixel inside/outside judgment circuit 14212.

The pixel inside/outside judgment circuit 14212 performs the inside/outside judgment for each pixel in the large region, specifically, judges whether or not at least one pixel exists inside the triangle.

In the case of FIG. 14A, at least one pixel exists inside the triangle, therefore the pixel inside/outside judgment circuit 14212 generates the large region data S1421 and outputs it to the large region data storage circuit 1422.

Then, the pixel inside/outside judgment circuit 14212 informs the large region movement circuit 14213 that the large region data was generated and output.

When informed by the pixel inside/outside judgment circuit 14212 that the large region data was generated, the large region movement circuit 14213 moves the large region for inside/outside judgment of the pixel and outputs data S14213 indicating the moved large region to the set-up data storage circuit 14211. Due to this, the large region data generation circuit 1421 proceeds to the processing of FIG. 14B.

In the processing of FIG. 14A, when the large region data generated by the large region data generation circuit 1421 is stored in the large region data storage circuit 1422, this stored data is read to the large region data division circuit 1423.

The large region data division circuit 1423 divides the large region data S1422 read from the large region data storage circuit 1422 by the region data generation circuit 14231 into the usual region data DUSR1 and DUSR2 equivalent to the unit square regions.

The data including a valid pixel in the divided large region data are output as the region data DUSR1 and DUSR2 to the region data storage circuit 14232.

Due to this, two region data DUSR1 and DUSR2 by the region data generation circuit 14231 are stored at predetermined addresses of the region data storage circuit 14232.

Then, the region data DUSR1 stored by the region data storage circuit 14232 is output to the texture engine circuit 143 as the DDA data S143 at a predetermined timing t0.

Next, in the processing of FIG. 14B, the data corresponding to the large region designated by the large region movement circuit 14213 is read from the stored data of the set-up data storage circuit 14211 to the pixel inside/outside judgment circuit 14212.

The pixel inside/outside judgment circuit 14212 performs the inside/outside judgment for each pixel in the large region, specifically, judges whether or not at least one pixel exists inside the triangle.

In the case of FIG. 14B, not even one pixel exists inside the triangle, therefore the pixel inside/outside judgment circuit 14212 does not generate the large region data and does not output anything to the large region data storage circuit 1422.

Then, the pixel inside/outside judgment circuit 14212 informs the large region movement circuit 14213 that no pixel existed inside the triangle and no large region data was generated.

Where informed by the pixel inside/outside judgment circuit 14212 that the large region data was not generated, the large region movement circuit 14213 moves the large region for the inside/outside judgment of pixel and outputs data S14213 indicating the moved large region to the set-up data storage circuit 14211. Due to this, the large region data generation circuit 1421 proceeds to the processing of FIG. 14C.

In the processing of FIG. 14B, the large region data generation circuit 1421 did not generate the large region data, therefore, the large region data storage circuit 1422 does not store the next large region data.

Accordingly, the large region data division circuit 1423 does not perform the division processing. At this time, the usual region data DUSR2 obtained in the processing of FIG. 14A is not output, but stored in the region data storage circuit 14232.

Then, the region data DUSR2 stored by the region data storage circuit 14232 is output to the texture engine circuit 143 as the DDA data S142 at a predetermined timing t1.

Next, in the processing of FIG. 14C, the data corresponding to the large region designated by the large region movement circuit 14213 is read from the stored data of the set-up data storage circuit 14211 to the pixel inside/outside judgment circuit 14212.

The pixel inside/outside judgment circuit 14212 performs the inside/outside judgment for each pixel in the large region, specifically judges whether or not at least one pixel exists inside the triangle.

In the case of FIG. 14C, at least one pixel exists inside the triangle, therefore the pixel inside/outside judgment circuit 14212 generates the large region data S1421 and outputs it to the large region data storage circuit 1422.

Then, the pixel inside/outside judgment circuit 14212 informs the large region movement circuit 14213 that the large region data was generated and output.

When informed by the pixel inside/outside judgment circuit 14212 that the large region data was generated, the large region movement circuit 14213 moves the large region for the inside/outside judgment of pixel and outputs the data S14213 indicating the moved large region to the set-up data storage circuit 14211. Due to this, the large region data generation circuit 1421 ends the processing for generation of the large region data.

In the processing of FIG. 14C, when the large region data generated by the large region data generation circuit 1421 is stored in the large region data storage circuit 1422, this stored data is read to the large region data division circuit 1423.

The large region data division circuit 1423 divides the large region data S1422 read from the large region data storage circuit 1422 by the region data generation circuit 14231 into the usual region data DUSR3 and DUSR4 equivalent to the unit square regions.

The data including a valid pixel among the divided large region data are output as the region data DUSR3 and DUSR4 to the region data storage circuit 14232.

Due to this, two region data DUSR3 and DUSR4 of the region data generation circuit 14231 are stored at predetermined addresses of the region data storage circuit 14232.

Then, the region data DUSR3 stored by the region data storage circuit 14232 is output to the texture engine circuit 143 as the DDA data S142 at a predetermined timing t2.

Further, the region data DUSR4 stored by the region data storage circuit 14232 is output to the texture engine circuit 143 as the DDA circuit S142 at the next timing t3.

The texture engine circuit 143 processes the (s, t, q) data indicated by the DDA data S142 by dividing the s data by the q data and dividing the t data by the q data. Then, it multiplies the division results "s/q" and "t/q" by the texture sizes USIZE and VSIZE to generate the texture coordinate data (u v).

Next, a read request including the texture coordinate data (u, v) generated with respect to the memory I/F circuit 144 is output from the texture engine circuit 143, and the (R, G, B) data stored in the graphics memory 145 is read via the memory I/F circuit 144.

Next, the texture engine circuit 143 multiplies the (R, G, B) data of the read (R, G, B) data and the (R, G, B) data included in the DDA data S142 from the prior stage triangle DDA circuit 142 with each other to generate the pixel data.

This pixel data is output from the texture engine circuit 143 to the memory I/F circuit 144.

Then, the memory I/F circuit 144 compares the z-data corresponding to the pixel data input from the texture engine circuit 143 and the z-data stored in the z-buffer and judges whether or not the image drawn by the input pixel data S145 is located closer (to the viewing point) than the image written in the display buffer the previous time.

When the result of the decision is that it is located closer, the z-data stored in the z-buffer is updated by the z-data corresponding to the image data.

Next, the memory I/F circuit 144 writes the (R, G, B) data into the display buffer of the graphics memory 145.

The data to be written (including also updating) is written into the predetermined memory in parallel via the write system circuit.

The memory I/F circuit 144 calculates the memory block of the graphics memory 145 storing the texture corresponding to the texture address at the pixel to be drawn from now on by that texture address, issues a read request to only that memory block, and reads the texture data.

In this case, the memory blocks not holding the corresponding texture data are not accessed for the texture reading, so it becomes possible to provide more access time for drawing.

In the drawing as well, similarly the memory block storing the pixel data corresponding to the pixel address to be drawn from now on is accessed to read the pixel data from the corresponding address in order to perform the writing (modify write operation). After the modification, the pixel data is written back to the same address.

When performing hidden plane processing, the memory block storing the depth data corresponding to the pixel address to be drawn from now on is accessed as well to read the depth data from the corresponding address for performing the modify write operation. If necessary, this is written back to the same address after the modification.

Then, when displaying the image on a not illustrated CRT, the CRT control circuit 146 generates the display address in synchronization with the given horizontal vertical synchronization frequency and issues a request for transfer of the display data to the memory I/F circuit 144.

The memory I/F circuit 144 transfers certain amounts of the display data to the CRT control circuit 146 according to the request.

The CRT control circuit 146 stores the display data in a not illustrated display use FIFO or the like and generates the index values of RGB at predetermined intervals.

The CRT control circuit 146 stores the RGB values for the indexes of RGB and transfers the RGB values for the index values to the not illustrated D/A converter.

Then, the RGB signals converted to the analog signals at the D/A converter are transferred to the CRT.

As explained above, according to the present embodiment, provision is made of a triangle DDA circuit 142 for generating large region data increased by at least one unit square regions worth of data based on the set-up data S141 including the change data input from the DDA set-up circuit 141 when at least one pixel is located inside the triangle in a unit square region USR including a plurality of pixels, storing the large region data, further dividing the stored large region data to usual region data equivalent to the unit square regions, and outputting the same as the DDA data S142 to the texture engine circuit 143. Therefore, when continuously drawing unit graphics, the divided region data can be continuously generated, wasteful processing due to invalid regions can be eliminated, and the region data can be continuously generated. As a result, there is the advantage that an image can be efficiently drawn.

Note that, in the three-dimensional computer graphics system 10 shown in FIG. 2, the case of geometry processing for generating the polygon rendering data being performed by the main processor 11 was exemplified, but a configuration performing this by the rendering circuit 14 can also be employed.

Summarizing the effects of the invention, as explained above, according to the present invention, when generating continuous unit graphics, when generating region data to be simultaneously processed, the region data can be continuously generated. As a result, an image can be efficiently drawn.

While the invention has been described with reference to specific embodiments chosen for purpose of illustration, it should be apparent that numerous modifications could be made thereto by those skilled in the art without departing from the basic concept and scope of the invention.

What is claimed is:

1. An image processing apparatus for generating pixel data based on information concerning a primitive to be drawn and simultaneously processing a plurality of pixels, the image processing apparatus comprising:
    a large region data generation circuit including:
        a set-up data storage circuit for receiving information concerning the primitive, storing the received information, and judging whether at least one pixel of the plurality of pixels is located inside the primitive,
        a large region movement circuit for designating a large region which includes a plurality of unit regions and which intersects the primitive, and
        a pixel inside/outside judgment circuit for, if at least one pixel of the plurality of pixels is judged to be located inside the primitive, judging whether at least one pixel of the plurality of pixels is located in the intersection of the large region and the primitive and, if at least one pixel of the plurality of pixels is located in the intersection of the large region and the primitive, generating large region data which include data corresponding to the large region and data corresponding to one or more pixels of the plurality of pixels located in the intersection;
    a large region data division circuit including a region data generation circuit for dividing the large region data into a plurality of unit region data corresponding to the plurality of unit regions, and outputting the plurality of unit region data to a texture engine circuit;
    a memory interface circuit for receiving, from the texture engine circuit, information based on the plurality of unit region data output from the large region data division circuit; and
    a processing circuit for performing graphics drawing processing in parallel for a plurality of pixels located in a predetermined region of the primitive based on the information based on the region data output from the region data division circuit, wherein the texture engine is for processing different unit region data of the plurality of unit region data sequentially and not simultaneously, while processing pixels corresponding to each of the plurality of unit region data simultaneously.

2. An image processing apparatus as set forth in claim 1, wherein the large region movement circuit further moves the large region to an adjacent large region intersecting the primitive when informed of the fact that the judging has been performed as to whether or not at least one pixel of the plurality of pixels is located in the intersection of the large region and the primitive.

3. An image processing apparatus as set forth in claim 1, wherein the large region data division circuit outputs each one unit region data of the plurality of unit region data only if at least one pixel of the plurality of pixels is located in the intersection of a unit region corresponding to the one unit region data and the primitive.

4. An image processing method for generating pixel data based on information concerning a primitive to be drawn and simultaneously processing a plurality of pixels, the method comprising:
    receiving, at a set-up data storage circuit, information concerning the primitive;
    storing, at the set-up data storage circuit, the received information;
    judging, by the set-up data storage circuit, whether at least one pixel of the plurality of pixels is located inside the primitive;

designating, by a large region movement circuit, a large region which includes a plurality of unit regions and which intersects the primitive;

if at least one pixel of the plurality of pixels is judged to be located inside the primitive, transmitting the received information from the set-up data storage circuit to a pixel inside/outside judgment circuit;

judging, by the pixel inside/outside judgment circuit, whether at least one pixel of plurality of pixels is located in the intersection of the large region and the primitive;

if at least one pixel of the plurality of pixels is located in the intersection of the large region and the primitive, generating large region data which include data corresponding to the large region and data corresponding to one or more pixels of the plurality of pixels located in the intersection;

storing the large region data;

dividing, by a large region data division circuit, the large region data into a plurality of unit region data corresponding to the plurality of unit regions;

outputting the plurality of unit region data to a texture engine circuit;

processing, by the texture engine, different unit region data of the plurality of unit region data sequentially and not simultaneously, while processing pixels corresponding to each of the plurality of unit region data simultaneously;

receiving, at a memory interface circuit, information based on the plurality of unit region data; and performing graphics drawing processing in parallel for a plurality of pixels located in a predetermined region of the primitive based on information based on the divided region data.

5. An image processing method as set forth in claim 4, further comprising moving the large region to an adjacent large region intersecting the primitive that when judging has been performed as to whether or not at least one pixel of the plurality of pixels is located in the intersection of the large region and the primitive.

6. An image processing method as set forth in claim 4, wherein each one unit region data of the plurality of unit region data is output to the texture engine circuit only if at least one pixel of the plurality of pixels is located in the intersection of a unit region corresponding to the one unit region data and the primitive.

7. An image processing apparatus for generating pixel data based on information concerning a primitive to be drawn and simultaneously processing a plurality of pixels, the apparatus comprising:

a digital differential analyzer (DDA) set-up circuit configured to calculate set-up data based in part on a difference from a pixel contained in the primitive to be drawn to edges of the primitive to be drawn;

a triangle DDA circuit coupled to the DDA set-up circuit and for receiving the set-up data, the triangle DDA circuit comprising:

a large region data generation circuit for receiving the set-up data and generating large region data, the large region data generation circuit comprising:

a set-up data storage circuit for receiving the set-up data, storing the set-up data, and judging whether at least one pixel of the plurality of pixels is located inside the primitive;

a large region movement circuit coupled to the set-up data storage circuit, the large region movement circuit for designating a large region which includes a plurality of unit regions and which intersects the primitive, and for outputting data indicating the large region to the set-up data storage circuit; and a pixel inside/outside judgment circuit coupled to the set-up data storage circuit, the pixel inside/outside judgment circuit, if at least one pixel of the plurality of pixels is located inside the primitive, for receiving set-up data and the data indicating the large region from set-up data storage circuit, judging whether at least one pixel of the plurality of pixels is located in the intersection of the large region and the primitive and, if at least one pixel of the plurality of pixels is located in the intersection of the large region and the primitive, for generating large region data which include data corresponding to the large region and data corresponding to one or more pixels of the plurality of pixels located in the intersection, wherein the large region movement circuit is also coupled to the pixel inside/outside judgment circuit and upon receiving information from the pixel inside/outside judgment circuit indicative that judging has been performed as to whether or not at least one pixel of the plurality of pixels is located in the intersection of the large region and the primitive, the large region movement circuit moves the large region to an adjacent large region intersecting the primitive and outputs data indicating the moved large region to the set-up data storage circuit;

a large region data storage circuit coupled to the large region data generation circuit and for receiving the generated large region data for storage;

a large region data division circuit coupled to the large region data storage circuit and for receiving the stored large region data, the large region data division circuit for dividing the received large region data into a plurality of unit region data corresponding to the plurality of unit regions;

a texture engine circuit coupled to the triangle DDA circuit and for receiving the plurality of unit region data sequentially at a predetermined timing from the large region data division circuit, the texture engine circuit for generating the pixel data based on the plurality of unit region data, wherein the texture engine is for processing different unit region data of the plurality of unit region data sequentially and not simultaneously, while processing pixels corresponding to each of the plurality of unit region data simultaneously; and a memory interface circuit coupled to the texture engine circuit and for receiving the pixel data, the received pixel data being indicative of a color value of a pixel in the primitive to be drawn.

8. An image processing apparatus as set forth in claim 7, wherein the texture engine circuit receives each one unit region data of the plurality of unit region data only if at least one pixel of the plurality of pixels is located in the intersection of a unit region corresponding to the one unit region data and the primitive.

* * * * *